July 7, 1970 L. BATHIAS 3,519,877
PINCUSHION EFFECT CORRECTING ARRANGEMENT
Filed June 10, 1968

United States Patent Office 3,519,877

Patented July 7, 1970

3,519,877

PINCUSHION EFFECT CORRECTING ARRANGEMENT

Louis Bathias, Vincennes, France, assignor to Societe Orega Electronique & Mecanique, a corporation of France Filed June 10, 1968, Ser. No. 735,825

Claims priority, application France, June 12, 1967, 110,020

Int. Cl. H01j *29/70*

U.S. Cl. 315—24 4 Claims

ABSTRACT OF THE DISCLOSURE

A pincushion correcting system wherein a signal having the field frequency is included into the supply circuit of the horizontal deflection system.

Figure 1:
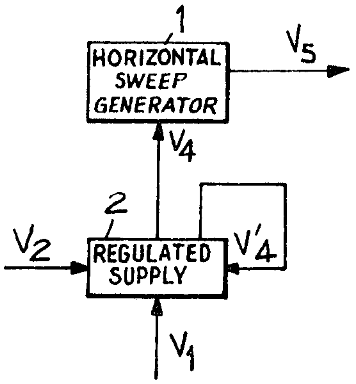

The present invention relates to the correction of the "pincushion" distortion occuring in colour television receiver images.

This distortion is due to the fact that the centre of curvature of the screen, if the screen is curved, does not coincide with the centre of deflection of the electron beam; this distortion is accentuated still further in the case of a flat screen.

In black and white receivers, the correction of this distortion is effected by means of magnets. However, this kind of approach cannot be used in colour television receivers since it is necessary to make the three electron beams of the picture tube converge.

Therefore, in colour television receivers, this kind of distortion is generally compensated by the action of corrective currents produced by means of what is referred to as a "pincushion transductor," one of which currents, having a frequency equivalent to the field frequency, is added to the horizontal sweep signals, and the other, having a frequency equivalent to the line frequency, is added to the field sweep signals.

In the case of receivers of the kind in which the horizontal deflection circuit and the high voltage (E.H.V.) generating circuit are separate transistorized units, it is difficult to use a pincushion transductor of this kind for the correction at the field frequency.

However, presently used transistorized deflection circuits are very generally of the type wherein the value of the D.C. supply voltage applied thereto is one of the factors determining the amplitude of the saw-tooth current flowing in the horizontal deflection coil, and the present invention takes advantage of this fact.

According to the invention there is provided a system for correcting the horizontal pincushion distortion in a television receiver, including a horizontal deflection circuit, or sweep generator, a vertical deflection circuit, or sweep generator and means for feeding a supply voltage to said horizontal deflection circuit, said system comprising auxilary means, coupled to said vertical deflection circuit, for including into said supply voltage a signal having a frequency equal to the field frequency of said receiver.

Figure 2:
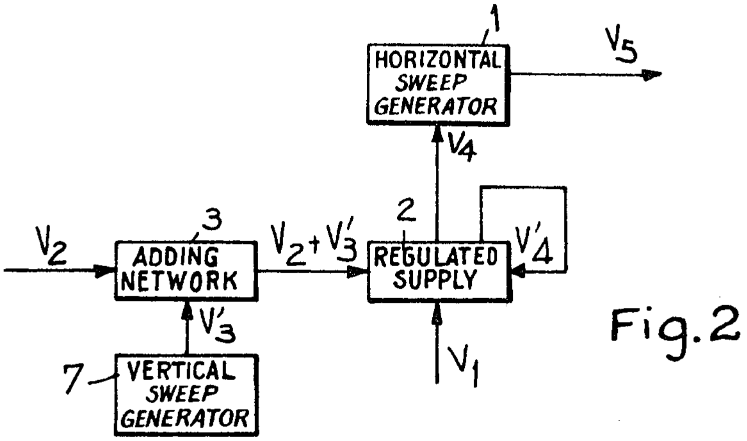

For a better understanding of the invention and to show how the same may be carried into effect reference will be made to the drawing accompanying the ensuing description and in which:

FIG. 1 schematically illustrates a horizontal deflection circuit, equipped with a supply arrangement regulated in a conventional way; and FIG. 2 schematically illustrates a horizontal deflection circuit equipped with a variable supply arrangement in accordance with the invention.

Figure 3:
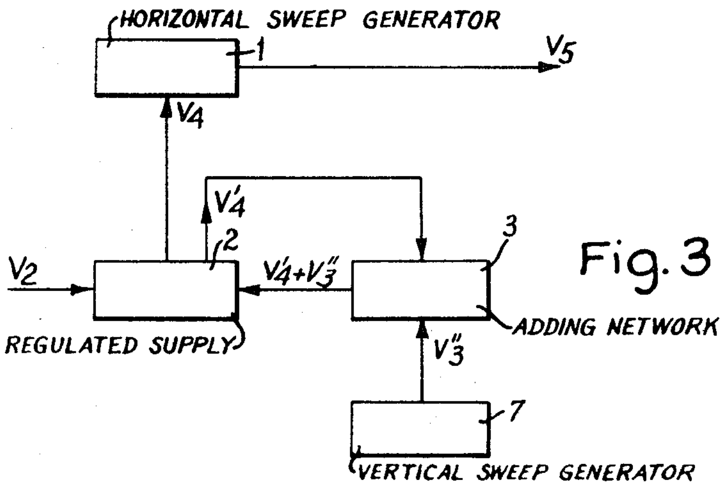

FIG. 3 schematically illustrates a horizontal deflection circuit with another variable supply arrangement in accordance with the invention.

It is well known that the pincushion distortion is such that lines which are vertical in a non distorted image are no longer straight vertical lines exception for the one passing through the screen centre (centre line) and in fact build up at either side of the central line, two sets of curved lines, which are convex with respect to the screen centre.

In the correcting device of the invention, the vertical sweep frequency correction is achieved by adding a correcting voltage to the supply voltage of the horizontal sweep circuit, this correcting voltage modifying the amplitude of the sawtooth waveform of the current flowing in the horizontal deflection system.

The supply voltage must of course be higher at the centre of the frame than at its upper and lower ends. It can be shown that the ideal form of the correcting signal having the field sweep frequency to be added to the constant component of the supply voltage, is that of a hyperbolic arc. In fact, a parabolic signal constitutes a sufficiently close approximation and has the advantage of being easy to produce.

Actually a substantially parabolic signal, having the same frequency as the field frequency and whose peak level coincides with the field centre, appears across the terminals of a capacitor, referred to as the S-correction capacitor, normally included in the vertical deflection circuit. By tapping off this signal by means of a potentiometer, it is possible to control the amplitude of the pincushion distorsion correction.

However, the parabolic signal obtained in this way may as the case may be have the correct concavity, i.e., be such that the peak of the parabola is the maximum of the signal, as is required in order to "modulate" the supply voltage in the horizontal deflection circuit, or have "the wrong concavity," i.e., be such that the peak of the parabola is the minimum of the signal.

It will be shown hereinafter how the device in accordance with the present invention is applicable in both cases, $V_3$ designating the correct parabolic signal, which is to be added to the supply voltage of the horizontal deflection circuit.

FIG. 1 illustrates in a highly schematic manner a horizontal deflection circuit and its supply arrangements, in a receiver in which the function of the horizontal deflection and the high voltage generation function (E.H.V.) are separated from one another.

In FIG. 1, the horizontal deflection circuit 1 is supplied with a regulated voltage $V_4$ and in turn furnishes to the horizontal deflection system (not shown in the figure) a voltage $V_5$.

The regulated voltage $V_4$ is the output voltage from a regulated supply arrangement 2 which has three inputs, the first receiving a rectified supply voltage $V_1$, from the main supply circuit, for example the town supply circuit, the second receiving a constant reference voltage $V_2$, which is compared with a fraction $$V'_4=\frac{V_4}{k}$$

(where $k$ is a constant) of the output voltage $V_4$, and the third input receiving the voltage $V'_4$. The result of the comparison between $V'_4$ and $V_2$, namely the error voltage $\epsilon$, is applied to the circuits of the device 2 in such a fashion that the output voltage $V_4$ of circuit 2 has a fixed value equal to $kV_2$, thus enabling the correction of variations of $V_4$ which may stem from the main supply circuit or from the load connected to the output of the horizontal deflection circuit 1.

If an appropriate parabolic signal $V_3$ is available, this signal can be added to the stabilized output voltage $V_4$ of the device 2, and the sum signal $V_4+V_3=kV_2+V_3$ applied to the horizontal deflection circuit 1.

The latter is of course assumed to be of the aforesaid type where the D.C. supply input voltage is one of the factors determining the amplitude of the saw-tooth current flowing in the horizontal deflection coil. Such deflection circuits and their theory are for instance described in the article by G. Schiess and W. Palmer, "Transistorized TV Horizontal Deflection and High Voltage System," IRE Transactions on Broadcast and Television Receivers, June 1958, page 19 and ff. The linear variation of the amplitude of the saw-tooth current as a function of the single D.C. supply voltage ($V_{cc}$) applied to the deflection circuit results from Formula 1, page 19, of this article. Voltage $kV_2+V_3$ mentioned herein is of course applied to the corresponding D.C. supply input.

However, in accordance with a preferred embodiment of the invention, the output voltage $V_4$ of the device 2 (which device, considered independently of the signals fed thereto, remains unchanged relatively to FIG. 1) is controlled by modifying the voltage applied to the second input of circuit 2, this having the advantage of enabling a parabolic signal $V'_3$ of lower amplitude than the signal $V_3$ hereinbefore mentioned, to be used, and of enabling the power taken by the parabolic signal source to be reduced too.

The corresponding correcting device has been illustrated in FIG. 2 where the same references designate the same elements as in FIG. 1. In this figure, the portion 7 of the vertical deflection circuit which provides the parabolic signal $$V_3'=\frac{V_3}{k}$$

has been illustrated. The voltage $V'_3$ is added, in the adding network 3, to the reference voltage $V_2$ applied to the second input of the device 3, in order to produce the reference voltage $$V_2+\frac{V_3}{k}$$

Accordingly, it will immediately be understood that the supply voltage $V_4$ will be a function of the desired value $k(V_2+V_3/k)=kV_2+V_3$ It is not difficult to see that if the parabolic signal $V_3''$ obtained, has the wrong concavity, in other words is equal to $-V'_3$ all that is necessary is to add it to the signal $V'_4$ and apply it to the third input of the device 2. In this case, the device 2 will act in such a way that $$V'_4+V_3''=V_2$$

or $$V_4=k(V_2-V_3'')=k(V_2+V'_3)=kV_2+V_3$$

FIG. 3 shows the arrangement corresponding to this mode of operation. In this figure, the same reference numerals respectively designate the same elements as in FIGS. 1 and 2.

It will be seen that if the parabolic signal tapped off from the potentiometer differs from the desired signal by a constant value K, this can easily be taken into account, for example, by subsequently controlling the reference voltage $V_2$.

Of course, the line frequency correction of the pincushion distortion can be carried out in the known manner.

What is claimed, is:

1. A system for effecting the correction, at the field frequency, of the pincushion distortion in a television receiver comprising: a horizontal sweep generator of the type having a D.C. input for receiving a D.C. supply voltage the value of which is one of the factors determining the amplitude of the saw-tooth current delivered by said generator; a vertical sweep generator; and a regulated supply arrangement having a first input coupled to an energy source, a second input coupled to a reference voltage source, an output coupled to said D.C. input of said horizontal sweep generator, and a feedback loop for controlling the output voltage of said arrangement, as a function of the voltage applied to said second input; said system comprising auxiliary means, coupled to said vertical sweep generator and to said arrangement, for including into said supply voltage a signal at said field frequency.

2. A system as claimed in claim 1, wherein said auxiliary means comprise an adder having a first input coupled to said vertical sweep generator, a second input connected to said reference voltage source, and an output connected to said arrangement second input.

3. A system as claimed in claim 1, wherein said auxiliary means comprise an adder having a first input coupled to said vertical sweep generator, a second input, and an output, said adder being inserted into said feedback loop through the second input and the output of said adder.

4. A system as claimed in claim 1, wherein said first input of said adder is coupled to said vertical sweep generator to receive therefrom a substantially parabolic signal.

References Cited

UNITED STATES PATENTS

| | | | |
|---|---|---|---|
| 2,758,248 | 8/1956 | Garrett | 315—27 |
| 2,869,026 | 1/1959 | Sanford | 315—27 |

RODNEY D. BENNETT, Jr., Primary Examiner

J. G. BAXTER, Assistant Examiner

U.S. Cl. X.R.

315—27